US011310773B2

(12) United States Patent
Viorel et al.

(10) Patent No.: US 11,310,773 B2
(45) Date of Patent: *Apr. 19, 2022

(54) SYSTEMS AND METHODS FOR LTE ALLOCATION IN A SHARED UNLICENCED SPECTRUM

(71) Applicant: CABLE TELEVISION LABORATORIES, INC, Louisville, CO (US)

(72) Inventors: Dorin Gheorghe Viorel, Erie, CO (US); Jennifer Andreoli-Fang, Boulder, CO (US); Neeharika Allanki, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,764

(22) Filed: Oct. 4, 2019

(65) Prior Publication Data

US 2020/0037291 A1    Jan. 30, 2020

Related U.S. Application Data

(63) Continuation of application No. 15/470,272, filed on Mar. 27, 2017, now Pat. No. 10,448,366.

(60) Provisional application No. 62/313,412, filed on Mar. 25, 2016.

(51) Int. Cl.
*H04W 72/04*   (2009.01)
*H04W 16/14*   (2009.01)
*H04W 72/10*   (2009.01)
*H04W 72/08*   (2009.01)

(52) U.S. Cl.
CPC .......... *H04W 72/04* (2013.01); *H04W 16/14* (2013.01); *H04W 72/082* (2013.01); *H04W 72/10* (2013.01)

(58) Field of Classification Search
None
See application file for complete search history.

(56) References Cited

U.S. PATENT DOCUMENTS

| 10,448,366 | B2 * | 10/2019 | Viorel | H04W 72/10 |
|---|---|---|---|---|
| 2015/0085841 | A1 * | 3/2015 | Sadek | H04J 3/16 |
| | | | | 370/336 |
| 2015/0163680 | A1 * | 6/2015 | Valliappan | H04L 5/0073 |
| | | | | 370/329 |
| 2015/0296384 | A1 * | 10/2015 | Sadek | H04W 16/14 |
| | | | | 455/452.1 |

(Continued)

*Primary Examiner* — Lonnie V Sweet
(74) *Attorney, Agent, or Firm* — Armstrong Teasdale LLP

(57) ABSTRACT

A method for allocating aggressive signal carriers in a target band of a wireless communication network is provided. The network includes at least one long term evolution (LTE) node and at least one non-LTE transmission source. The target band includes at least two adjacent pairs of contiguous radio frequency (RF) channels. The method includes steps of scanning each contiguous RF channel of the target band to measure a respective value of non-LTE RF energy therein, determining, from the measured non-LTE RF energy, that a first one of the contiguous RF channels is occupied by a non-LTE carrier, and allocating an LTE carrier to a second one of the contiguous RF channels, different than the first one of the contiguous RF channels, based on the determination.

22 Claims, 4 Drawing Sheets

(56) References Cited

U.S. PATENT DOCUMENTS

| | | | |
|---|---|---|---|
| 2016/0088631 A1* | 3/2016 | Hedayat | H04B 7/063 |
| | | | 370/329 |
| 2016/0095110 A1* | 3/2016 | Li | H04W 72/1215 |
| | | | 370/329 |
| 2016/0227578 A1* | 8/2016 | Lee | H04W 74/0816 |
| 2016/0295434 A1* | 10/2016 | Safavi Naeini | H04W 74/0825 |
| 2018/0084429 A1* | 3/2018 | Guo | H04W 72/0406 |

* cited by examiner

SYSTEMS AND METHODS FOR LTE ALLOCATION IN A SHARED UNLICENCED SPECTRUM

CROSS REFERENCE TO RELATED APPLICATIONS

This application is a continuation of U.S. application Ser. No. 15/470,272, filed Mar. 27, 2017, now U.S. Pat. No. 10,448,366, which prior application claims the benefit of and priority to U.S. Provisional Patent Application Ser. No. 62/313,412, filed Mar. 25, 2016, the disclosures of all of which are incorporated herein by reference in their entireties.

BACKGROUND

The field of the disclosure relates generally to management of shared wireless communications, and more particularly, to wireless communication signal allocation in a shared unlicensed spectrum.

Conventional wireless communication systems may utilize unlicensed shared spectra. For example, the 2.4 GHz, 3.5 and 5 GHz frequency bands could be used for Wi-Fi, Bluetooth, Zigbee, and a range of other consumer, industrial, and medical wireless technologies. Other technology platforms also share a spectrum in other frequency ranges, and available wireless spectra will become more intensively shared as demand for wireless technologies increases. In some instances, the licensed spectra are strictly licensed to specified access technologies, and are not generally used by other access technologies within the same licensed spectrum.

Some conventional shared unlicensed spectrum technology systems utilize algorithm- and sensing-based distributed access, which enable common use of a wireless resource, despite a lack of active coordination among users. For example, typical Wi-Fi systems employ a carrier sense multiple access with collision avoidance (CSMA/CA) network multiple access method, which is also known as "listen-before-talk" (LBT), in which carrier sensing is used, but nodes attempt to avoid collisions by transmitting only when the channel is sensed to be idle (i.e., not being used). Wi-Fi devices employ a common, standards-based protocol to avoid interference among themselves and other users, which provides a substantially equal probability of access across all users in channel conditions.

However, new technologies are being introduced into the shared spectrum, which do not employ the cooperative techniques used by Wi-Fi devices. In particular, the introduction of mobile technologies utilizing Long Term Evolution (LTE), when operating in the same unlicensed spectra (LTE-U) and same geographical location, are known to interfere with existing technologies like Wi-Fi due to the centralized architecture of LTE and mobile systems where spectrum access is scheduled by the core network, instead of being coordinated with other access technologies accessing the same spectra resources. Mobile technologies utilizing LTE may dominate the access to a shared unlicensed spectrum without regard to other wireless access technologies. These non-cooperative mobile technologies can be implemented in an aggressive manner that utilizes a disproportionate share of airtime, as compared with cooperative technologies. For example, when a scheduled technology, such as LTE, competes with a technology that employs distributed coordination techniques, such as Wi-Fi, the Wi-Fi system will inherently defer to (that is, fail to transmit) the scheduled technology. In other words, the Wi-Fi system (and similar cooperative technologies) will "hear" the LTE system (or non-cooperative technologies) "talking," and will wait their turn to access and transmit to the network. Ultimately this type of behavior will drive to an asymmetrical usage of the target spectrum resources, the LTE access technology becoming a dominant user of the spectrum under discussion.

Wi-Fi and other cooperative/distributed technologies are thus at an inherent disadvantage in the shared spectrum, and will experience significant interference, degraded performance, and user experience when forced to compete with non-cooperative technologies as compared with when co-existing with other 802.11 access nodes. Hardware changes to Wi-Fi devices and access points (APs) have been proposed as embedded solutions to detect the non-cooperative (aggressor) signals, but such hardware changes are expensive, and would exclude existing Wi-Fi devices since retrofitting existing 802.11 nodes is prohibitive in operation.

Licensed-Assisted Access (LAA), which is part of the LTE-U family (also referred to as LAA LTE), presents particular coexistence challenges within a shared spectrum. LAA LTE, for example, specifies both contiguous and noncontiguous multi-carrier allocations in the non-licensed 5 GHz bands. Introduction of LAA LTE has significantly increased the traffic throughput of LTE, and impacts the ability of 802.11ac access nodes to execute channel bonding.

BRIEF SUMMARY

In an embodiment, a method for allocating aggressive signal carriers in a target band of a wireless communication network is provided. The network includes at least one long term evolution (LTE) node and at least one non-LTE transmission source. The target band includes at least two adjacent pairs of contiguous radio frequency (RF) channels. The method includes steps of scanning each contiguous RF channel of the target band to measure a respective value of non-LTE RF energy therein, determining, from the measured non-LTE RF energy, that a first one of the contiguous RF channels is occupied by a non-LTE carrier, and allocating an LTE carrier to a second one of the contiguous RF channels, different than the first one of the contiguous RF channels, based on the determination In an embodiment, a method for selecting an RF channel in a target band of a wireless communication network is provided. The method allocates at least one long term evolution (LTE) carrier, and includes steps of scanning a first contiguous channel and a second contiguous channel of four contiguous RF channels in the target band, scanning a third contiguous channel and a fourth contiguous channel of the four contiguous RF channels, measuring RF channel power for each of the four contiguous RF channels, comparing the measured RF channel power for each of the four contiguous RF channels, and selecting a particular one of the four contiguous RF channels corresponding to the lowest measured RF channel power.

In an embodiment, a wireless communications system operating in an unlicensed target band is provided. The system includes at least one long term evolution (LTE)-enabled node. The node includes a memory and a processor, and is configured to wirelessly send and receive LTE carrier data to and from at least one user equipment. The system further includes a first access point located within a transmission proximity of the at least one LTE-enabled node, and is configured to wirelessly send and receive cooperative transmission data to and from at least cooperative technology device. The processor is further configured to measure the RF power in each carrier of a plurality of carriers in the target band, store values for the measured power in the memory, compare the stored power values, and select a one of the plurality of carriers corresponding to the lowest stored power value in the memory.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
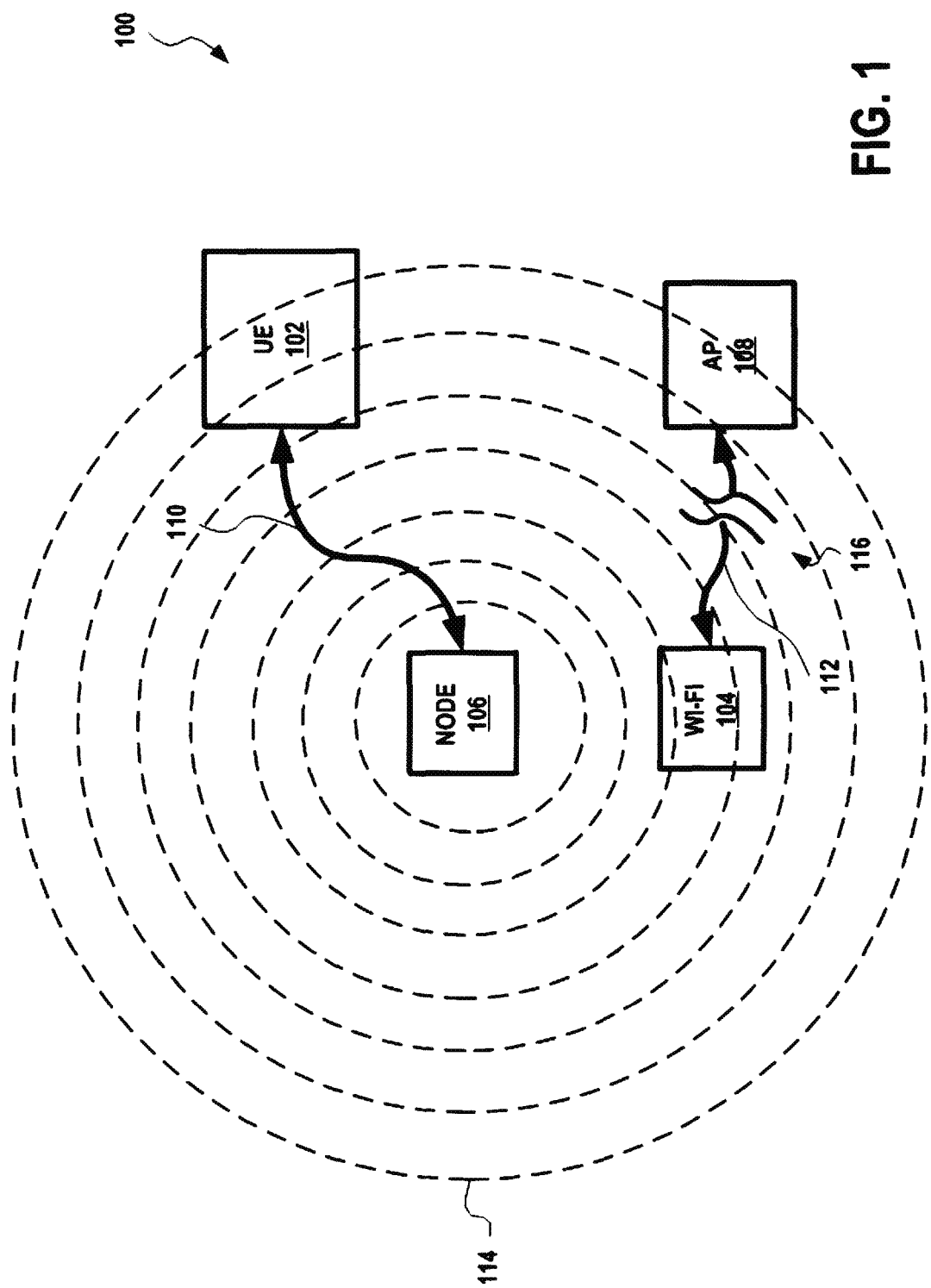
FIG. 1 is a schematic illustration of an operation of co-existent wireless access systems in the same unlicensed spectrum, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following description features processes and systems for allocating LTE carriers in the unlicensed 5 GHz band, such that they may coexist with one or more 802.11 type wireless communication technologies within the same unlicensed band (and typically geographical proximity as well), which may include a CSMA/CA access system. The present embodiments relate to management of wireless communications employing different access protocols operating in the same overlapping coverage area.

In an exemplary embodiment, new LTE carriers in the unlicensed 5 GHz band are allocated by lowest priority when an 802.11ac channel bonding rule is impacted. In coexistence environments where both Wi-Fi and LTE technologies are operating, and where both technologies utilize a majority (use more than half) of the available RF bandwidth, an LTE node may be configured such that it will not schedule more than half of the total RF bandwidth. This configuration allows the differing technologies to respect air time fairness for both access technologies. In such coexistence environments, the node may be further configured to schedule to a lower priority primary or aggregated carriers which could overlap with the assignation of new Wi-Fi primary channels.

In an embodiment, a processor is configured with an algorithm for scheduling a new LAA LTE 20/40 MHz carrier in a channel adjacent to an operational 20/40 MHz Wi-Fi carrier, such that a 40/80 MHz expansion is created. In some embodiments, the 40/80 MHz expansion is established with the lowest priority. In at least one embodiment, the LAA operates to avoid the adjacent channel if another 20/40 MHz channel is available for LAA operation. In this embodiment, the algorithm for the LAA LTE carrier allocation may function to "camp" (i.e., register) the LTE device on the under-utilized carrier. In some embodiments, the algorithm stores measured RF power for each detected carrier in the target band, compares the measured RF power(s), and then selects the carrier having the lowest measured RF power.

The embodiments herein describe and illustrate systems and methods for allocation of LAA LTE carriers that are co-existent with wireless communications in the unlicensed spectrum, or unlicensed bands (e.g., 2.4 GHz, 3.5 GHz, 5 GHz, etc.). For purposes of this discussion, the term "co-existent" refers to different wireless access systems re-using the same spectral resources within the same general geographical proximity of one another. Examples of technologies used in the unlicensed spectrum include Wi-Fi, Bluetooth, Zigbee, with Wi-Fi (i.e., 802.11/a/b/g/n/ac/ax/ad and other 802.11 variants) presently being the dominant technology for unlicensed shared access. Wi-Fi is a LBT technology that uses CSMA/CA to optimize the efficiency of distributed access across otherwise asynchronous access transceivers. Such cooperative technology includes coexistence features that allow it to first verify the availability of the media (e.g., by LBT), before accessing a channel, that the channel is clear prior to transmission of data. CSMA/CA then allows for the management of access control to all asynchronous users (i.e., user devices) on that channel.

Mobile technologies such as LTE are synchronous access technologies, operating in the unlicensed spectrum (e.g., LTE-U) in a non-cooperative (e.g. using a non-compliant LBT algorithm with 802.11 type systems) manner as compared with other access technologies that cannot synchronize to the LTE radio access network (RAN). LTE has been widely deployed, and functions to dominate the unlicensed spectrum through a centralized control of aggressive transmission techniques. The cooperative LBT based technologies are colloquially referred to as "polite" technologies, whereas the non-cooperative technologies (including LTE and LAA) are colloquially referred to as "aggressive" technologies. LTE is considered aggressive because it schedules and applies traffic to the accessed channel without first assessing if the channel is clear of other network transmissions. LTE-U will typically take over the channel when co-existing with 802.11 access technologies for more than 50% of the time without such separate systems. The present systems and methods, on the other hand, are advantageously configured to schedule LAA LTE carriers to more "politely" coexist with Wi-Fi transmissions.

As described herein, the phrase "user equipment" includes an electronic device or system utilizing an aggressive, non-cooperative technology protocol, such as LTE. The phrase "Wi-Fi device" includes an electronic device, such as a station (or STA), that has the capability to use one of the existing 802.11 protocols. For example, a Wi-Fi device can include, without limitation, one or more of a laptop, a desktop personal computer (PC), personal digital assistant (PDA), AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

In the exemplary embodiment, each of the foregoing adaptation techniques may be implemented alone, or in combination with one or more of the other techniques. In some embodiments, the several techniques may be implemented simultaneously, or in succession. In this example, a device or node utilizing LAA technology is configured to be allocated to a particular channel of the shared spectrum. These advantageous adaptation techniques are described further below with respect to several drawings.

FIG. 1 is a schematic illustration of an exemplary shared spectrum system 100, according to an embodiment. System 100 includes at least one user equipment (UE) 102, a Wi-Fi device/Wi-Fi station 104, a node 106, and an access point (AP) 108. User equipment 102 may be, for example, a mobile handset, or similar device, that implements an LTE transmission 110, such as LAA LTE with node 106. In the exemplary embodiment, node 106 may be, for example, an E-UTRAN Node B, also known as Evolved Node B, (abbreviated as eNodeB or eNB) as a hardware element that is communicatively coupled with a mobile phone network (not shown) that communicates wirelessly with user equipment 102. In some embodiments, node 106 may further include a base transceiver station (BTS) for a Global System for Mobile communication (GSM) network. In the exemplary embodiment, Wi-Fi device 104 includes a transceiver or cooperative node (not shown), which establishes a Wi-Fi transmission 112 with access point 108. In an embodiment, the cooperative node of Wi-Fi device 104 includes the transceiver.

In operation, node 106 generates an aggressive transmission signal 114 according to a duty cycle (symbolically represented by dashed lines) within the range of Wi-Fi device 104 and AP 108, which signal creates an interference 116 in Wi-Fi transmission 112. For the example discussed herein, aggressive transmission signal 114 is an LAA LTE carrier transmission, however, the present disclosure is applicable to other aggressive transmission signals. In the exemplary embodiment, Wi-Fi transmission 112 implements an LBT protocol that will typically give way to the detected presence of aggressive transmission signal 114. That is, a cooperative shared spectrum technology, such as Wi-Fi, has the ability to "listen" to the channel of the unlicensed shared spectrum to determine the presence of other users. This listening ability is conventionally employed only for the specific purpose outlined in distributed access protocols for coexistence with other cooperative technologies. FIG. 1 is illustrated schematically, and is not intended to represent the actual scale or proximity of the several elements depicted therein. For example, in practical operation, node 106 may operate at significantly higher power levels than user equipment 102, and thereby be a more significant factor to creating interference 116, and thus FIG. 1 is equally instructive with the respective positions of user equipment 102 and node 106 interchanged. The principles described herein are applicable to either scenario.

In an embodiment, Wi-Fi device 104 operates proximate to one or more cells of user equipment 102, according to an 802.11 protocol, such as 802.11ac and each cell of user equipment 102 is capable of processing its own LTE download and upload traffic (e.g., transmission 110). However, since the LTE traffic can be transmitted simultaneously with the Wi-Fi traffic (e.g., transmission 112) under some conditions, Wi-Fi device 104 will perceive the received LTE traffic as interference (e.g., interference 116), which will degrade the performance of the received Wi-Fi traffic, by either or both of Wi-Fi device 104 and access point 108. In the exemplary embodiment, system 100 is thus advantageously configured to utilize existing hardware of node 106, including the programmable capability of a processor therein (not shown) to schedule the LAA LTE transmission 114 to bond, or to avoid, adjacent channels and the available spectrum so as to eliminate or reduce overlap with assigned Wi-Fi channels.

Figure 2:
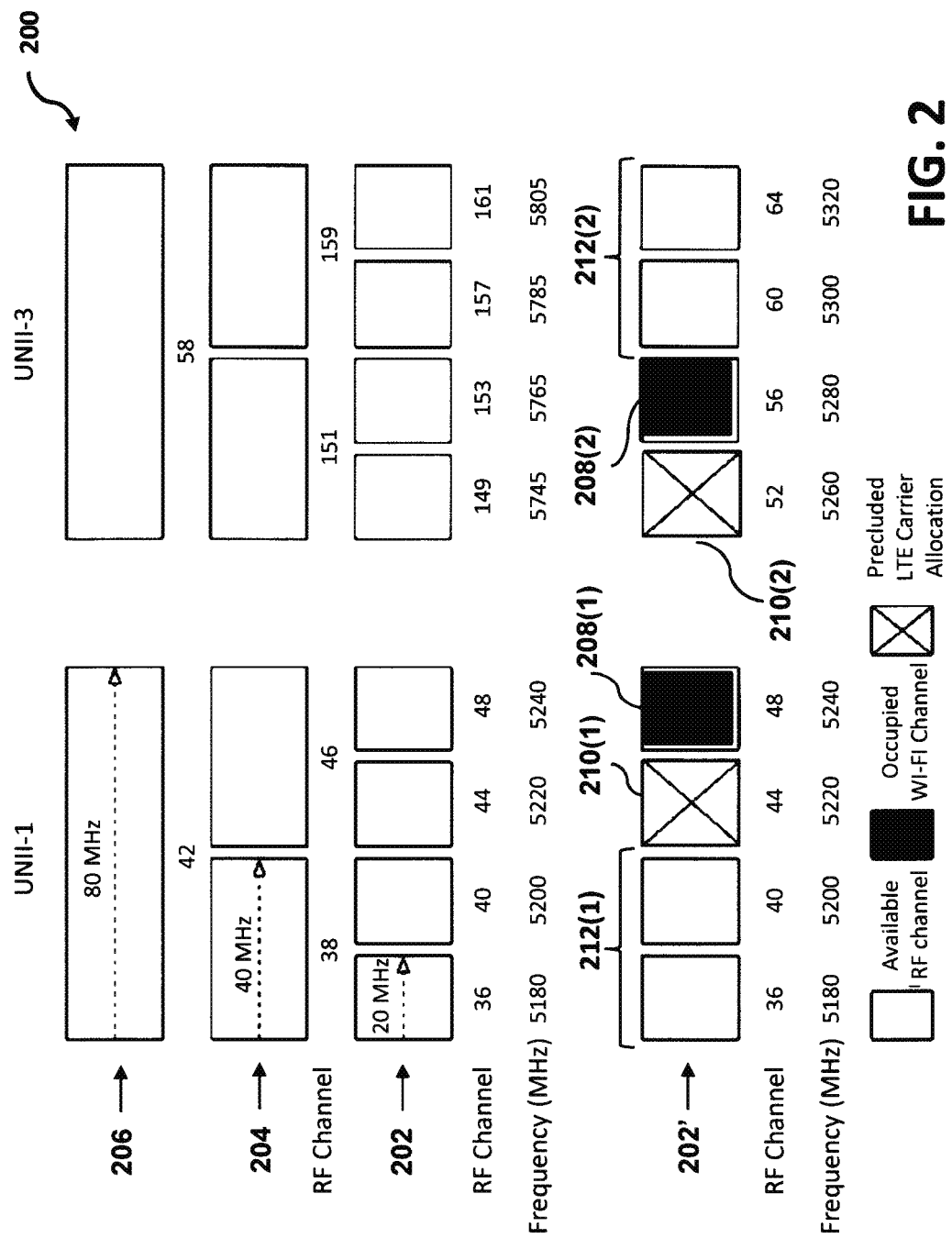
FIG. 2 illustrates an exemplary channel bonding effect for the system depicted in FIG. 1.

FIG. 2 illustrates an exemplary channel bonding effect 200, which may be utilized with system 100, FIG. 1. In this example, channel bonding effect 200 is considered with respect to the 802.11ac protocol and, in implementation, allows base 20 megahertz (MHz) channels 202 effectively expand their capability, through adjacent bonding, upwards into 40 MHz channels 204, 80 MHz channels 206, or greater (e.g., 160 MHz channels, not shown), according to the systems and methods described herein. 802.11ac bonding utilizes contiguous channels. LAA LTE carriers though, may utilize non-contiguous channels for multi-carrier allocations. According to the advantageous systems and methods described herein, the multi-carrier capability of LAA LTE, when coexisting in the same band with 802.11ac systems (e.g., Wi-Fi), will not impact the 802.11ac channel bonding capability, due to the availability of other 20 MHz RF channels in the band (e.g., for the 20 MHz channel 202 example).

In operation, channel bonding effect 200 demonstrates the availability of 20 MHz channels 202 within the spectrum environment, for LAA LTE selection, according to the relative occupation of 20 MHz channels 202' by one or more Wi-Fi carriers. For ease of explanation, occupied 20 MHz channels 202' are illustrated to depict one occupied Wi-Fi channel 208, one LTE-precluded channel 210, and a plurality of available RF channels 212 for each respective 80 MHz channel 206. In this example, 80 MHz channels 206 are represented as Unlicensed National Information Infrastructure (UNIT) bands, specifically, UNII-1 and UNII-3 respectively.

Preclusion of a particular 20 MHz channel 202' is established according to the channel bonding effect. That is, an available channel (e.g., available RF channel 212) becomes a precluded channel (e.g., LTE-precluded channel 210) from selection by an LAA LTE carrier when an immediately adjacent 20 MHz channel 202', with respect to an associated 40 MHz channel 204, is occupied by a Wi-Fi carrier (e.g., occupied Wi-Fi channel 208).

In an exemplary embodiment, the LTE node (e.g., node 106, FIG. 1) is programmed (e.g., such as through the processor therein) to assign new LAA LTE carriers. In some embodiments, the assignment of LAA LTE carriers is performed according to considerations which will not allow for channel bonding of adjacent channels. The principles described above with respect to FIG. 2 further applicable with respect to the following examples of channel occupation in the 20 MHz range.

In a first example, when two contiguous edge channels are occupied by a Wi-Fi transmission, then one of the opposite two channels could be utilized by an LAA LTE carrier, if available. In a second example, when a middle channel is occupied by a Wi-Fi transmission, then one of the opposite two edge channel could be utilized by the LAA LTE carrier. In a third example, when two non-contiguous channels in a band (e.g., UNII-1 or UNII-3) are occupied by a Wi-Fi transmission, the LAA LTE may utilize one of the channels between them. In a fourth example, when a Wi-Fi transmission utilizes three 20 MHz channels within an 80 MHz band, the LAA LTE carrier may utilize the remaining available channel among the four 20 MHz channels. In a fifth example, when a Wi-Fi transmission utilizes all four 20 MHz channels within the 80 MHz band, the LAA LTE carrier is assigned by the processor to utilize the occupied 20 MHz channel that is least used. That is, the processor measures or determines the amount of RF power utilized within each occupied 20 MHz channel, and assigns the LAA LTE carrier to the channel with the lowest measured RF power.

The processing of FIG. 2 is explained further with respect to Table 1 and Table 2, below, which depict exemplary channels within the frequency ranges described above, and the center frequencies associated therewith.

TABLE 1

| Bonded Channel (40 Mhz) | Primary Channel (20 Mhz) | Primary Center Frequency [MHz] | Secondary Channel (20 Mhz) | Secondary Center Frequency [MHz] | Allocation |
|---|---|---|---|---|---|
| 38+ | 36 | 5180 | 40 | 5200 | UNII-1 |
| 38− | 40 | 5200 | 36 | 5180 | UNII-1 |
| 46+ | 44 | 5220 | 48 | 5240 | UNII-1 |
| 46− | 48 | 5240 | 44 | 5220 | UNII-1 |
| 151+ | 149 | 5745 | 153 | 5765 | UNII-3 |
| 151− | 153 | 5765 | 149 | 5745 | UNII-3 |
| 159+ | 157 | 5785 | 161 | 5805 | UNII-3 |
| 159− | 161 | 5805 | 157 | 5784 | UNII-3 |

In consideration of the exemplary values depicted in Table 1, in an exemplary embodiment, an LAA-enabled node (e.g., a processor of an eNB) schedules primary and/or secondary carriers in the unlicensed 5 GHz bands as follows: (1) the node scans the primary 20 MHz 802.11ac RF channels (e.g., 20 MHz channels 202) to detect RF energy with a RF Power≥THR1, where THR1 is a first reference threshold energy value measured in decibels (dB); and (2) the node schedules the new LTE RF carrier (primary or aggregated) in one or more 20 MHz channels where non-LTE energy is not detected. If the node detects that all primary 20 MHz RF channels are occupied by non-LTE energy (e.g., Wi-Fi transmissions), then the node will schedule primary or aggregated LTE RF carriers such that no LTE RF carriers are scheduled in a secondary 802.11ac RF channel where non-LTE energy (e.g., Wi-Fi) is detected in the related primary channel. In other words, the node does not schedule an LTE carrier in a secondary channel when Wi-Fi energy is detected in the associated primary channel.

TABLE 2

| Bonded Channel (80 Mhz) | Primary Channel (40 Mhz) | Primary Center Frequency [MHz] | Secondary Channel (40 Mhz) | Secondary Center Frequency [MHz] | Allocation |
|---|---|---|---|---|---|
| 42+ | 38 | 5190 | 46 | 5230 | UNII-1 |
| 42− | 46 | 5230 | 38 | 5190 | UNII-1 |
| 155+ | 151 | 5755 | 159 | 5795 | UNII-3 |
| 155− | 159 | 5795 | 151 | 5755 | UNII-3 |

In consideration of the exemplary values depicted in Table 2, in an exemplary embodiment, the LAA-enabled node schedules primary and/or secondary carriers in the unlicensed 5 GHz bands similarly to the process described above with respect to Table 1. That is, the node scans the primary 20 MHz 802.11ac RF channels (e.g., 20 MHz channels 202) to detect RF energy with a RF Power≥THR2, where THR2 is a second reference threshold energy value measured in decibels (dB).

If the node detects non-LTE RF energy (e.g., Wi-Fi) in channels 36 and 44, or in channels 52 and 60 above THR2, then the node will not schedule any primary or aggregated LTE carriers in channels 36, 40, 44, and 48, or in channels 52, 56, 60, and 64. Alternatively, if non-LTE RF energy is detected above THR2 in channels 36 and 44, and in channels 52 and 60, the node will not schedule LTE carriers within these channels until channels 44 or 60 will become available.

Figure 3:
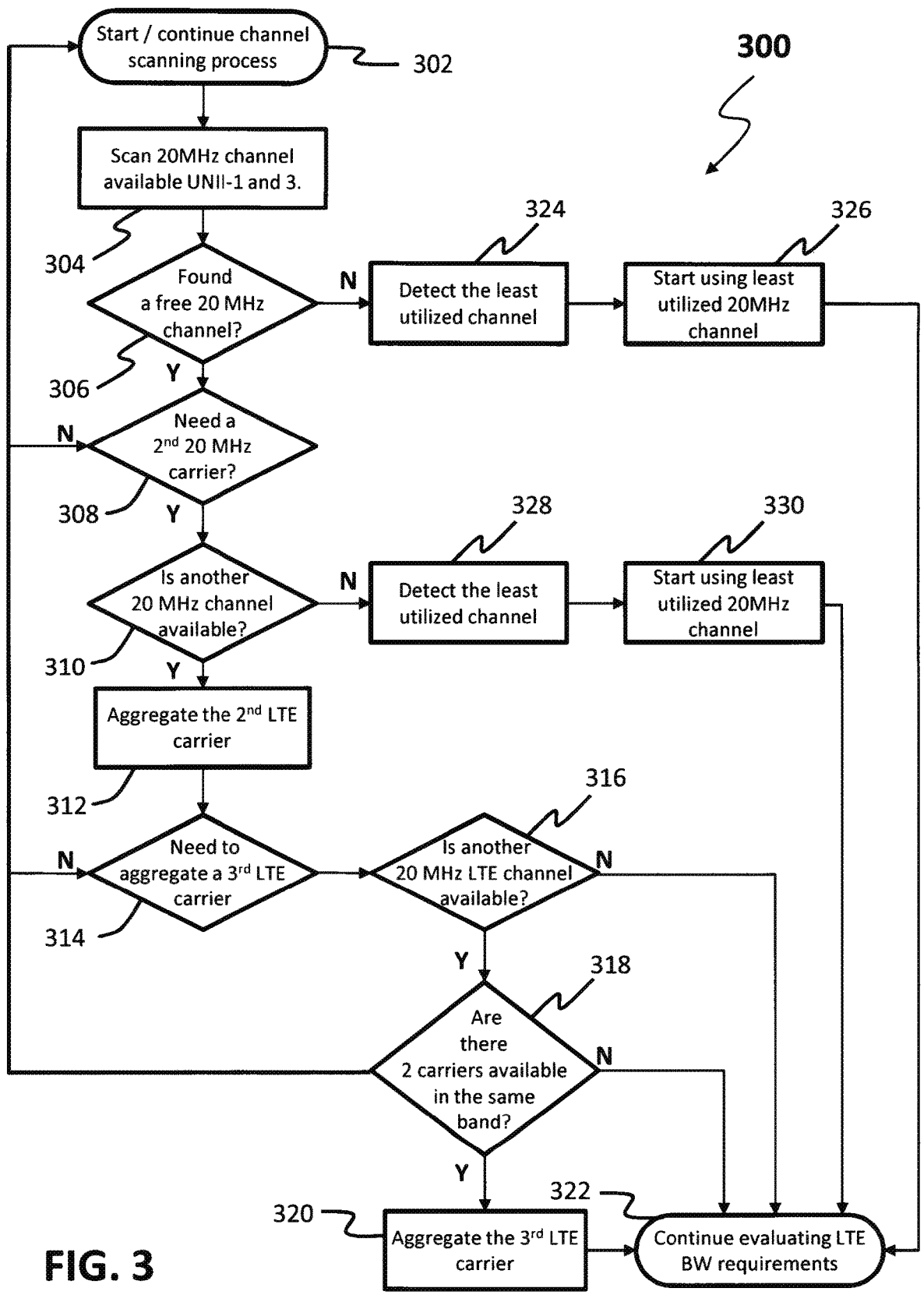
FIG. 3 is a flow chart diagram of an exemplary detection process, according to an embodiment.

FIG. 3 is a flow chart diagram of an exemplary detection process 300, which can be implemented with the embodiments described above. Detection process 300 is described with respect to 20 MHz bandwidth channels available in UNII-1 and UNII-3. Nevertheless, a person of ordinary skill in the art will understand the principles described herein are applicable to channels of different bandwidths, as well as different unlicensed spectra. Process 300 starts detection process at step 302, and then proceeds to step 304, where a processor of a node (e.g., node 106, FIG. 1) initializes an LTE scheduler to scan the UNII-1 and UNII-3 bands for an available 20 MHz channel, and then proceeds to step 306. Step 306 is a decision step. In step 306, the node determines if a 20 MHz channel is available for an LTE carrier. If a channel is available, process 300 selects the available channel (see FIG. 4, described further below), and proceeds to step 308.

Step 308 is also a decision step. In step 308, the scheduler of the node determines whether a second 20 MHz channel is necessary to bond the LTE carrier. If a second channel is needed for bonding, process 300 proceeds to step 310. Step 310 is also a decision step. In step 310, the node scans the target bands (e.g., UNII-1 and UNII-3) to determine whether a second channel is available. If a second 20 MHz channel is available, process 300 selects the second available channel (see e.g., FIG. 4) and proceeds to step 312. In step 312, the node aggregates the selected LTE carriers and proceeds to step 314.

Step 314 is a decision step. In step 314, the node determines whether a third LTE carrier is to be aggregated. If a third carrier is required for aggregation, process 300 proceeds to step 316. Step 316 is another decision step. In step 316, the node again scans for an available channel, similar to the steps described above. If a third channel is available, process 300 proceeds to decision step 318. In step 318, the node evaluates the carriers to determine whether to of the carriers are available in the same band. If two carriers are available the same band, process 300 proceeds to step 320, where the third LTE carrier is aggregated. In some embodiments, in step 320, the scheduler of the node considers local regulations which may govern aggregation over multiple bands. Process 300 then proceeds to step 322, where the node continues to evaluate LTE bandwidth requirements. In some embodiments, step 322 may be step 302, or alternatively, proceed directly to step 302.

Referring back to step 306, if the node determines that a 20 MHz channel is not available, process 300 proceeds to step 324. In step 324, the node measures channels in the target band and evaluates which channel in the target band is the least utilized. In an exemplary embodiment, as described above, the least utilized channel is determined by measuring the non-LTE RF energy in each channel, and then selecting the channel exhibiting the lowest RF energy. Process 300 then proceeds to step 326, where the LTE carrier camps on the least utilized 20 MHz channel, and then proceeds to step 322.

Referring back to step 308, if it is determined that a second 20 MHz carrier is not necessary, process 300 proceeds back to step 302. Similarly, referring back to step 314, if it is determined that a third LTE carrier need not be aggregated, process 300 also proceeds back to step 302. In contrast, referring back to step 316, if it is determined that an additional 20 MHz LTE channel is not available, process 300 proceeds to step 322. Similarly, referring back to step 318, if it is determined that two carriers are not available within the same band, process 300 also proceeds to step 322.

Figure 4:
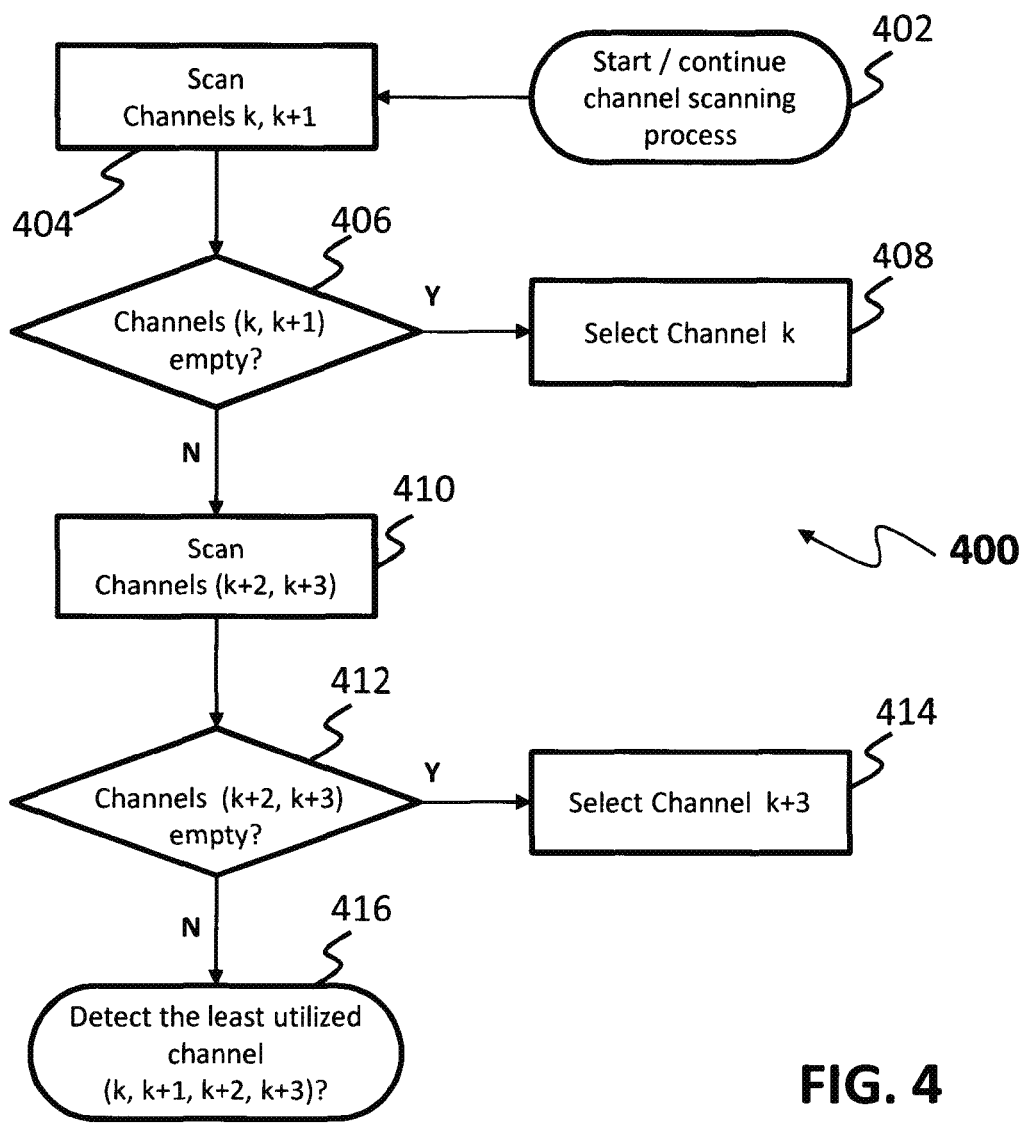
FIG. 4 is a flow chart diagram of an exemplary selection process, according to an embodiment.

FIG. 4 is a flow chart diagram of an exemplary selection process 400, which can be implemented with the embodiments described above. Process 400 starts a scanning and selection process at step 402, and then proceeds to step 404, where a processor of the node is initialized (e.g., by a programmed algorithm) to scan channels k and k+1 within the target bands (e.g., UNII-1 and UNII-3), and proceed to step 406. Step 406 is a decision step. In step 406, the node determines whether channels k and k+1 are available, that is, empty of non-LTE (e.g., Wi-Fi) RF energy. If channels k and k+1 are available, process 400 proceeds to step 408, where channel k is selected.

If, on the other hand, both of channels k and k+1 are not available, process 400 proceeds to step 410, where the node will scan channels k+2 and k+3, and then proceeds to step 412. Step 412 is a decision step. In step 412, the node determines whether channels k+2 and k+3 are available. If channels k+2 and k+3 are available, process 400 proceeds to step 414, where the node will select the available one of channels k+2 and k+3. In an exemplary embodiment, if both of channels k+2 and k+3 are available, process 400 will select channel k+3 in step 414. Referring back to step 412, if neither of channels k+2 and k+3 is available, the processing algorithm will evaluate all four channels k, k+1, k+2, and k+3, determine which among the 4 channels is the least occupied, and cause the LTE carrier to camp on the least occupied channel.

In some embodiments, an algorithm of the processor is further programmed to measure RF channel energy/power for all channels in the band, store in a memory (not shown) the RF channel power measurement values, and calculate the least occupied channel according to the channel corresponding to the lowest RF channel power measurement value stored in the memory. In an exemplary embodiment, the algorithm is programmed to repeat any and all of the steps described above for each band (e.g., UNII) available in the respective geographic area in which the LTE carrier may be received.

Accordingly, by utilizing existing hardware and programmability already present in existing LTE devices, the novel systems and methods described above realize significant advantages over conventional shared access systems by implementing the LTE allocation and scheduling for shared access with the non-LTE transmissions, such as Wi-Fi, and other IEEE 802.11 protocols. The present systems and methods are further advantageously capable of bonding adjacent RF channels having smaller bandwidths to realize functionality available to RF channels having larger bandwidths.

Exemplary embodiments of shared access communication management systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for allocating aggressive signal carriers in a target band of a wireless communication network including at least one long term evolution (LTE) node and at least one non-LTE transmission source, the target band including first and second contiguous expanded radio frequency (RF) channels, each of the first and second contiguous expanded RF channels including at least two sequentially contiguous sub-channels of substantially similar bandwidth within the respective expanded RF channel, the method comprising the steps of:

scanning each sequentially contiguous sub-channel of the target band to measure a respective value of non-LTE RF energy therein;

determining, from the measured non-LTE RF energy, that a first sub-channel of the sequentially contiguous sub-channels is occupied by a non-LTE carrier, wherein the first sub-channel is contained within the first expanded RF channel; and allocating an LTE carrier to a second sub-channel of the sequentially contiguous sub-channels based on the determination, wherein the second sub-channel is contained within the second expanded RF channel.

2. The method of claim 1, wherein the measured non-LTE RF energy represents one or more of Wi-Fi, Bluetooth, and Zigbee transmissions from the non-LTE transmission source.

3. The method of claim 1, wherein the LTE carrier is a license-assisted access (LAA) LTE transmission signal.

4. The method of claim 1, wherein the step of determining further comprises a substep of detecting that significant non-LTE RF energy is not measured within (i) the second sub-channel, and (ii) a third-sub-channel contained within the second expanded RF channel.

5. The method of claim 4, further comprising the step of bonding the second sub-channel with the third sub-channel within the second expanded RF channel to form a bonded combination of the second sub-channel with the immediately adjacent third sub-channel.

6. The method of claim 5, further comprising the step of assigning the second expanded RF channel a lower priority with respect to further channel allocation in the target band.

7. The method of claim 4, wherein the step of determining further determines that a fourth sub-channel contained within the first expanded RF channel is precluded from allocation of the LTE carrier.

8. The method of claim 1, wherein in the step of allocating, the node schedules no more than half of the total available RF bandwidth of the target band to LTE carrier signals.

9. The method of claim 1, wherein:

in the step of scanning, non-LTE RF energy is measured in each of the sequentially contiguous sub-channels;

the step of determining further determines that at least one sequentially contiguous sub-channel of the second expanded RF channel is occupied by a non-LTE carrier; and in the step of allocating, the LTE carrier is assigned to a particular sub-channel of the sequentially contiguous sub-channels exhibiting the lowest value of the measured RF energy.

10. The method of claim 1, wherein the non-LTE transmission source utilizes an IEEE 802.11 protocol.

11. The method of claim 1, wherein the target band is an unlicensed national information infrastructure (UNII) band.

12. The method of claim 11, the wherein the target band is UNII-1 or UNII-3.

13. A method for selecting an RF channel from four sequentially contiguous channels in a target band of a wireless communication network for allocation of at least one long term evolution (LTE) carrier, each of the four sequentially contiguous channels having substantially the same frequency bandwidth, the method comprising the steps of:

scanning a first contiguous channel and a second contiguous channel of the four sequentially contiguous RF channels in the target band, wherein the second contiguous channel is immediately adjacent the first contiguous channel;

scanning a third contiguous channel and a fourth contiguous channel of the four sequentially contiguous RF channels, wherein the third contiguous channel is immediately adjacent the fourth contiguous channel and located between the second and fourth contiguous channels;

measuring RF channel power for each of the four sequentially contiguous RF channels;

comparing the measured RF channel power for each of the four sequentially contiguous RF channels; and selecting a particular channel of the four sequentially contiguous RF channels corresponding to the lowest measured RF channel power within the target band for allocation of the LTE carrier.

14. The method of claim 13, wherein the measured RF channel power represents non-LTE energy.

15. The method of claim 14, wherein the non-LTE energy is one or more of Wi-Fi, Bluetooth, and Zigbee transmissions from a non-LTE transmission source.

16. The method of claim 15, wherein the non-LTE transmission source is a Wi-Fi access point.

17. The method of claim 13, further comprising the step of storing in a memory of an LTE node values representing the RF channel power measured for each of the four sequentially contiguous RF channels.

18. The method of claim 17, wherein the step of comparing is performed by a processor of the LTE node.

19. The method of claim 18, wherein the method is performed by an algorithm programmed into the processor of the LTE node.

20. The method of claim 13, wherein, when both of the first and second contiguous channels are unoccupied, the LTE carrier is allocated to the first contiguous channel.

21. The method of claim 13, wherein when both of the third and fourth contiguous channels are unoccupied, the LTE carrier is allocated to the fourth contiguous channel.

22. The method of claim 13, wherein when all of the four contiguous RF channels are occupied, the LTE carrier is allocated to the least utilized channel of the four sequentially contiguous RF channels.

* * * * *